Patented Sept. 2, 1924.

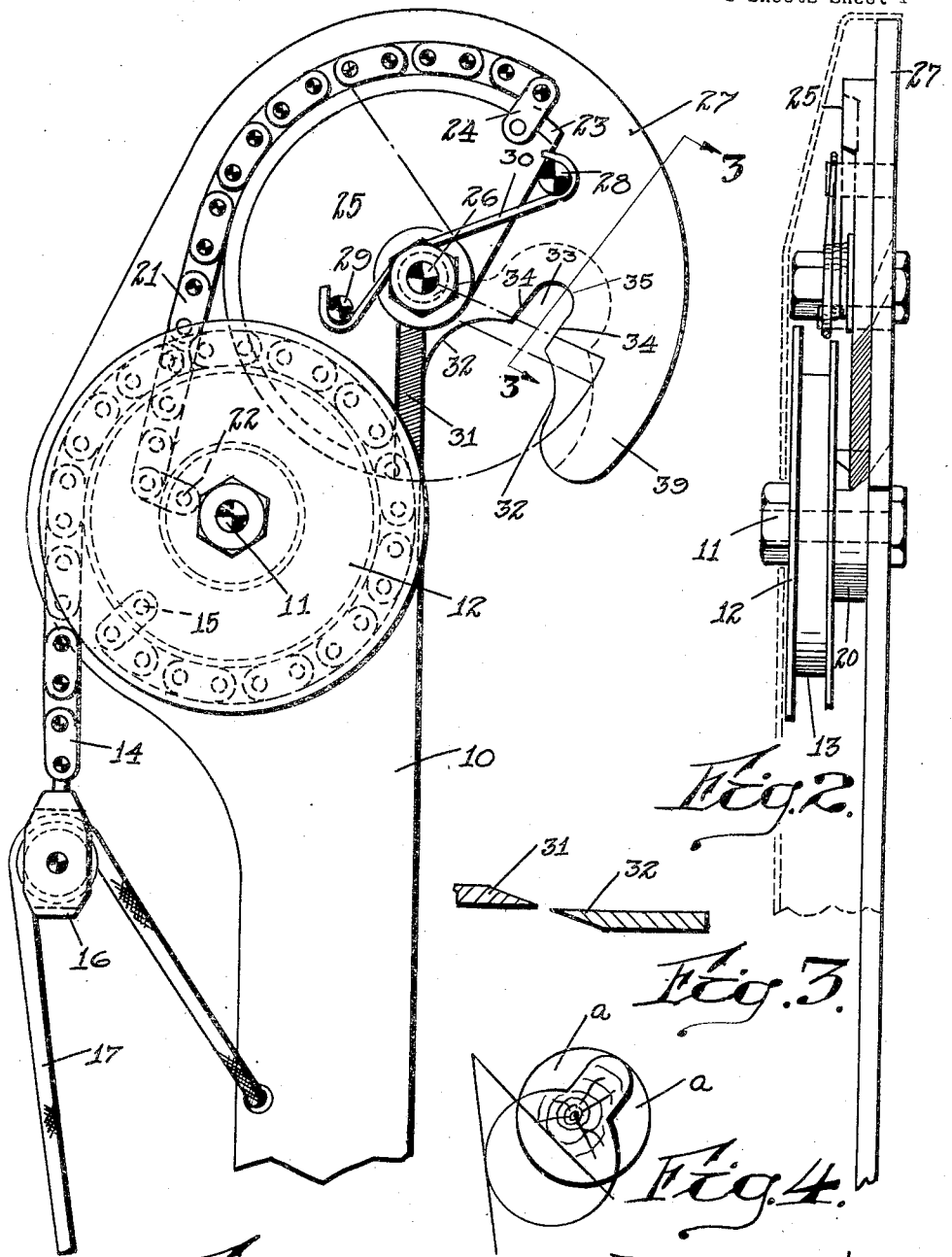

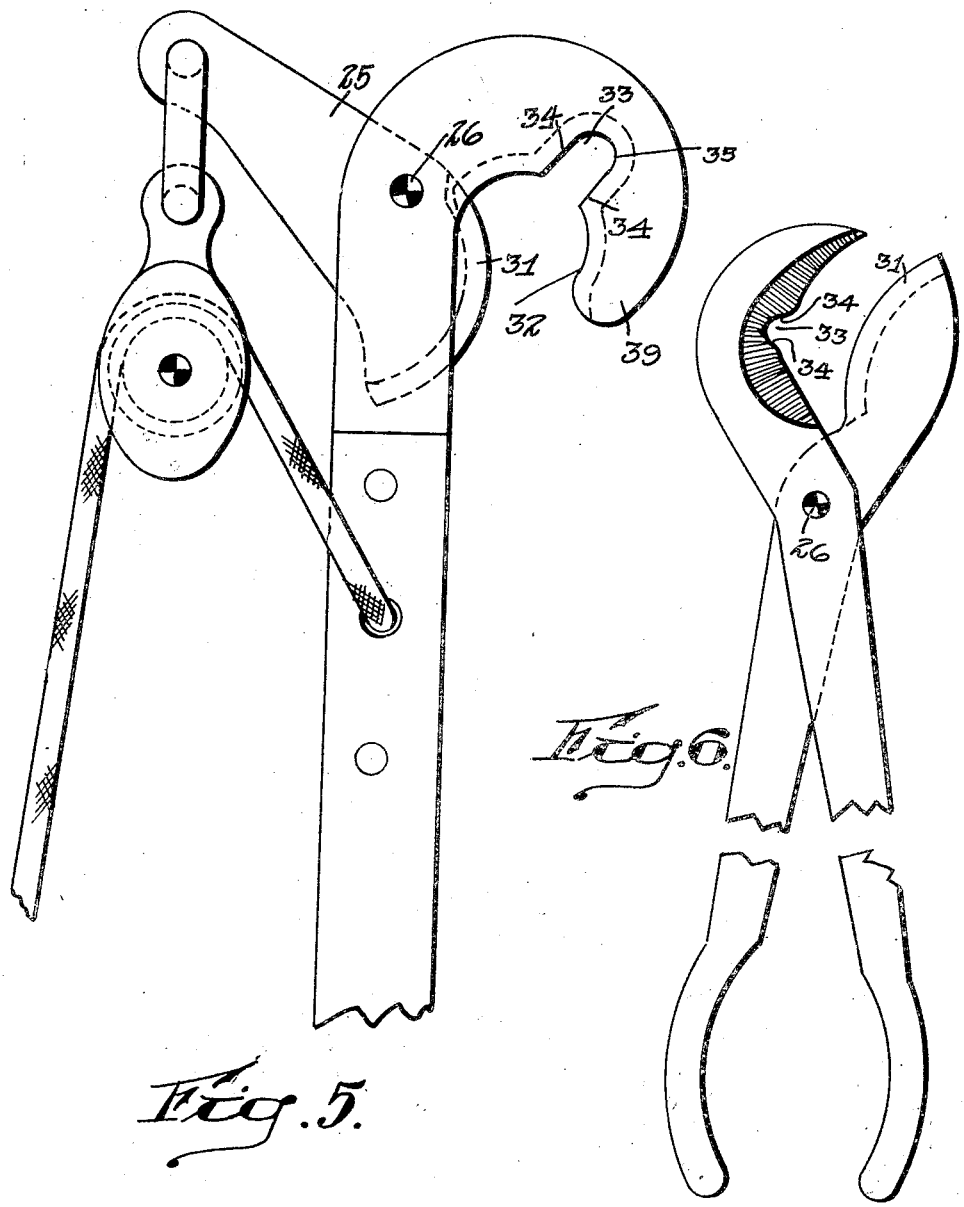

1,507,225

UNITED STATES PATENT OFFICE.

LEON J. BARRETT, OF WORCESTER, MASSACHUSETTS.

PRUNING SHEARS.

Application filed May 4, 1923. Serial No. 636,710.

*To all whom it may concern:*

Be it known that I, LEON J. BARRETT, a citizen of the United States, residing at Worcester, in the county of Worcester and State of Massachusetts, have invented new and useful Pruning Shears, of which the following is a specification.

This invention relates to a cutting device preferably in the form of a pair of shear blades for pruning purposes and to means for operating them.

The principal objects of the invention are to provide a pruning shear that has no projecting parts so there is nothing to hinder its being moved up among the branches of a tree; to provide means for operating the shear blade of such a nature as to secure a high multiplication of leverage; to provide a moving blade in such a form that it can be swung around the center and having a concentric surface on which a flexible connection is secured for swinging it; to provide an opposite blade of such a nature as to insure that its first action will be to slice the limb on opposite sides by a true slicing or sliding motion so that the limb will be cut with the exertion of a less amount of power than would be the case if a straight motion were provided at right angles to the cutting edge; and more specifically to form the blade with a U-shaped depression in its edges; and to provide the edge throughout the depression with a slanting sharpened cutting surface so that when the limb of the tree is forced into the depression the edges of the blade at the sides of the depression will cut into the limb in the manner above mentioned and leave only a small part of the limb to be cut out by a direct shear action. Other features and advantages of the invention will appear hereinafter.

Reference is to be had to the accompanying drawings in which—

Fig. 1 is a side view of a pair of pruning shears constructed in accordance with this invention with the casing omitted;

Fig. 2 is an edge view of the same;

Fig. 3 is a sectional view showing the position of the blades when nearly closed together and taken on the line 3—3 of Fig. 1;

Fig. 4 is a sectional view of a limb being cut off, showing the parts that have been cut when the blades are only part way together;

Fig. 5 is a side view of a modification; and

Fig. 6 is a side view of another modification showing the improvement in the blade itself.

In Figs. 1 to 4, I have shown the shear as mounted on a pole or handle 10 which may be of any desired length. Mounted on this pole at a point near the top is a stud 11 on which is rotatably mounted a wheel 12 having a drum 13 for a flexible chain or belt 14. The end of this chain is secured at 15 to the wheel and the other end is connected with a pulley block 16. Over the pulley on the block passes a cord or other flexible connection 17 by which the block can be drawn down and the wheel 12 turned thereby. Also mounted on this wheel is another circular drum 20 for receiving another chain 21 or other flexible connection. This is also secured to the wheel at 22 at one end. Consequently when the chain 14 is pulled down and unwound the chain 21 will be wound up on its smaller drum.

The chain 21 passes over a circular surface 23 on a wheel 25 and is fastened at 24 thereto. This wheel 25 is mounted to turn on a stud 26 fixedly mounted on the pole or head 10. The pole 10 can be made of wood or metal, and it is provided with a blade 27 either integral with it or secured to it in any desired way. Preferably on this blade is mounted a stud 28 and on the wheel 25 is another stud 29. Around these extend the ends of a spring 30 which is also coiled around the stud 26. This spring tends to draw the wheel 25 up into the position shown in Fig. 1 against the stud 28 which constitutes a stop for it. Obviously pulling down on the pulley block 16 tends to swing the wheel 25 away from that position. The spring will pull it back when the pressure is released.

The wheel 25 is formed of a piece of steel having a circular surface 23 for receiving the chain which extends around through practically a quarter of a circle and it is also sharpened at one edge to constitute a blade 31. This blade may be integral with the wheel 25 and swings with it on the stud 26 as a center.

The blade 27 is formed with a concave edge 32 which is shown as substantially semi-circular in form and large enough to take in the largest limb that is intended to be cut with this device. The blade 27 has a nose 39 at its end extending beyond it and all parts above are convex and without levers, arms or other projections. Thus it is so shaped that it can be thrust up from below among the limbs of a tree without being impeded by contact with the limbs. The substantially semi-circular edge 32 is interrupted at its deepest point by a reentrant notch 33 made in the edge of the blade, that is, the edge is set back a considerable distance providing two parallel straight sides 34 and a small semi-circular bottom 35 at the rear of them. Thus the surfaces 32, 34, 35, 34 and 32 constitute the entire cutting edge. Back of these surfaces the blade is beveled off to form a sharp strong cutting edge which of course is sharpened from time to time. It will be noted also that when the plate 31 swings around into a position where it is about to register with the edges 34, that is, a position between that shown in Fig. 1 and that shown in Fig. 4, the two edges 34 are perpendicular to the cutting edge of this plate. This is located in this way so that the limb of the tree will be forced into the notch 33 in the most efficient way possible, that is, by the exertion of the force at right angles to the direction of motion so that a true slicing action will be secured on these two parallel cutting edges 34.

In the operation of this device the parts normally assume the position shown in Fig. 1 and they are inserted up in the tree very conveniently as there are no parts projecting from the curved head 27 that will prevent or impede the forcing of this device up among the limbs. It is then brought down so that the curved cutting edge 32 rests on the limb to be cut off and extends around it. Now with the whole device supported by that limb the operator can let it hang there at any time and is free to pull down on the cord 17 and swing the blade 31 inwardly toward the opposite cutting edges 32. The action of this is indicated in Fig. 4. This blade 31 cuts into the wood a little as it swings, but its principal function at first is to force the limb inwardly along the line 3—3 substantially until the advance side of it reaches the bottom of the curved portion 35 of the blade. The action up to this point is to cause the cutting edges 34 to slice into the wood on opposite sides to cut away along the surfaces a in Fig. 4. In this way a very large percentage of the cut is performed by a small amount of work because it is very easy to cut into the wood by a cutting motion in that direction. At the point in the cutting operation illustrated in Fig. 4 the area to be cut has been reduced very materially and yet the full force of the cutting action has not been applied, because the limb has never, up to that point, been held in a stationary position. From that point on, however, the cutting action is more nearly like the ordinary shearing action as far as that made by the blade 31 is concerned, and also the surfaces 35 and 32 of the stationary cutting blade. But as the blade 31 closes it continues to push the limb through and the slicing action above mentioned is continued throughout the cutting until the surfaces sliced off coincide with the surface cut by the blade 31. After that point is reached, the only thing that needs to be cut further by the ordinary shear action is the small area in the notch 33. It will be noticed that this reduces the force required to cut off the limb, for the only part that has to be cut off by the ordinary shear action, that is by moving toward each other of two cutting surfaces along lines normal to their cutting edges, is in area very much less than half the area of the limb. The areas at the sides of that area are cut all the way through on both sides by a sliding slicing action caused by the forcing of the limb along the edges 34, which edges are not at right angles to the direction of motion but more nearly parallel therewith.

This particular shape of blade is very important because of reducing the amount of pressure required for cutting off a limb, and I have shown it in Fig. 5 as applied to a well-known type of pruning shear. I have used the same reference numerals here as in Fig. 1 for the purpose of showing which parts are the same. The method of operating the cutting blade will not be described as it is not part of this invention.

The same remarks apply to Fig. 6 in which another well-known type of blade is shown. I do not wish to be limited to the use of these blades for pruning purposes, although that is the principal thing for which they were invented.

Although I have illustrated and described only three forms of the invention, I am aware of the fact that other modifications can be made therein by any person skilled in the art without departing from the scope of the invention as expressed in the claims. Therefore I do not wish to be limited to all the details of construction or any one of the forms herein shown and described but what I do claim is:—

1. In a pruning shear, the combination with a support or handle having a blade thereon, of a wheel mounted on said support and adapted to turn freely and provided with two drums, one larger than the other, a flexible connection wound on the larger drum and extending therefrom for turning the wheel, a second flexible connection fixed to the smaller drum and adapted to be wound thereon by the turning of the wheel but extending outwardly from the wheel, another wheel to which the end of the second connection is secured, having a curved surface on which it is adapted to be wound, a spring for holding the second wheel in its extreme position, the last named wheel having a pruning blade for co-operating with the blade on the handle.

2. In a pruning shear, the combination with a support or handle having a blade fixed thereon, of a wheel mounted on said support and adapted to turn freely thereon and provided with two drums, one larger than the other, a flexible connection wound on the larger drum and extending along the handle therefrom for the purpose of turning the wheel, a second flexible connection fixed to the smaller drum and adapted to be wound thereon by the turning of the wheel but extending outwardly from the wheel, another wheel to which the end of the second connection is secured, having a curved surface on which it is adapted to be wound, a spring for holding the second wheel in its extreme open position, the last named wheel having a radial pruning blade thereon for cooperating with the blade on the handle.

3. In a pruning shear, the combination of a handle having a concave pruning blade thereon near its end and open at the lower side, a stud on the handle adjacent said blade, a second pruning blade pivoted on said stud for co-operating with the first named blade, a wheel on which the second blade is mounted, a spring surrounding said stud for swinging the wheel into a position to hold the blade open, a stud on the first blade constituting a stop for the wheel and engaging one end of said spring, a chain mounted on the circumference of said wheel and fixed thereto and means for operating said chain to swing the wheel in opposition to the spring and into cooperation with the other blade.

4. As an article of manufacture, a blade having a concave cutting edge with a notch therein, the edges of said notch being parallel and sharpened to constitute cutting edges and being substantially perpendicular to a straight line drawn between the ends of the first named cutting edge.

5. In a shear, the combination with a handle of a stationary concave blade having a notch at a point between the ends of its cutting edge, the opposite sides of said notch being beveled and sharpened to constitute cutting edges, and a second blade pivoted to swing on an axis at the side of the concave blade so as to force a round limb or other article located between the two blades inwardly into the notch and slice it along the sides of said notch as the movable blade moves forward, one of said sides of the notch being substantially transverse with respect to the edge of the second blade when in cutting position.

6. In a shear, the combination of two blades pivotally connected together, one of said blades having a concave cutting surface provided with a re-entrant notch at a point between the ends of the concave cutting surface, the opposite sides of said notch being parallel to each other and substantially perpendicular to the cutting edge of the other blade when in position about to register with said notch and being beveled and sharpened to constitute cutting edges, whereby when the blades are forced together, the article to be cut will be forced into the notch, and it will be sliced at the sides of said notch to partially sever it before its forward surface reaches the extreme end of the notch.

7. In a shear, the combination of two blades, one having a substantially semicircular cutting surface provided with a re-entrant notch, the sides of said notch being substantially parallel, radial, beveled and sharpened to constitute cutting edges, whereby when the blades are forced together, the article to be cut will be forced into the notch, and it will be sliced at the sides of said notch to partially sever it before its forward surface reaches the extreme end of the notch.

8. In a shear, the combination of two pivoted blades, one having a cutting surface provided with a re-entrant notch, the sides of said notch being substantially parallel and sharpened to constitute cutting edges substantially perpendicular to the edge of the other blade when it is in cutting position.

In testimony whereof I have hereunto affixed my signature.

LEON J. BARRETT.